(12) United States Patent
Chung et al.

(10) Patent No.: US 12,199,670 B2
(45) Date of Patent: Jan. 14, 2025

(54) OPTIMAL OPERATION METHOD OF HIGH-FREQUENCY PHASE DITHERING TECHNIQUE FOR COMPENSATING FOR INTERFERENCE NOISE IN ANALOG-OPTICAL TRANSMISSION-BASED MOBILE FRONTHAUL NETWORK, AND TRANSMITTER USING SAME

(71) Applicant: Korea Advanced Institute of Science and Technology, Daejeon (KR)

(72) Inventors: Yun Chur Chung, Daejeon (KR); Byunggon Kim, Daejeon (KR); Sunghyun Bae, Daejeon (KR); Minsik Kim, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 249 days.

(21) Appl. No.: 17/775,207

(22) PCT Filed: Mar. 3, 2020

(86) PCT No.: PCT/KR2020/003004
§ 371 (c)(1),
(2) Date: Nov. 21, 2022

(87) PCT Pub. No.: WO2021/091028
PCT Pub. Date: May 14, 2021

(65) Prior Publication Data
US 2023/0216585 A1     Jul. 6, 2023

(30) Foreign Application Priority Data
Nov. 8, 2019 (KR) .................. 10-2019-0142225

(51) Int. Cl.
*H04B 10/2513* (2013.01)
*H04B 10/516* (2013.01)

(52) U.S. Cl.
CPC ....... *H04B 10/2513* (2013.01); *H04B 10/516* (2013.01)

(58) Field of Classification Search
CPC .............. H04B 10/2513; H04B 10/516; H04B 10/2507; H04B 10/25759; H04B 10/501
(Continued)

(56) References Cited

U.S. PATENT DOCUMENTS 5,798,858 A * 8/1998 Bodeep ............. H04B 10/2507
398/91
7,792,432 B2 * 9/2010 Iannelli ............ H04B 10/50597
398/183

(Continued)

FOREIGN PATENT DOCUMENTS

| CN | 1186387 A | * | 7/1998 | ........... H04B 10/504 |
| JP | 2003028724 A | * | 1/2003 | .............. G01J 11/00 |

(Continued)

OTHER PUBLICATIONS

International Search Report mailed on Jul. 27, 2020, issued in corresponding International Application No. PCT/KR2020/003004, filed Mar. 3, 2020, 3 pages.

*Primary Examiner* — Abbas H Alagheband
(74) *Attorney, Agent, or Firm* — CHRISTENSEN O'CONNOR JOHNSON KINDNESS PLLC

(57) ABSTRACT

Proposed are an optimal operation method of a high-frequency dithering technique for compensating for interference noise in an analog optical transmission-based mobile fronthaul network, and a transmitter using same. An interference noise compensation method using high-frequency phase dithering performed in an analog optical transmission-based mobile fronthaul network may include the steps in which: a frequency-multiplexed wireless signal is converted in an optical transmitter to an intensity-modulated optical signal; and the phase of the optical signal intensity-modu- (Continued)

lated in the optical transmitter is dithered with an Orthogonal Frequency-Division Multiplexing (OFDM) signal.

13 Claims, 9 Drawing Sheets

(58) Field of Classification Search
USPC .......................................................... 398/130
See application file for complete search history.

(56) References Cited

U.S. PATENT DOCUMENTS

| | | | |
|---|---|---|---|
| 9,203,544 B2 * | 12/2015 | Yang ....................... | H04J 14/06 |
| 9,281,898 B2 * | 3/2016 | Guo ................. | H04B 10/50575 |
| 9,973,278 B2 * | 5/2018 | Wang ................. | H04B 10/2537 |
| 10,594,541 B2 * | 3/2020 | Garcia .................... | H04L 12/44 |
| 2011/0150484 A1 * | 6/2011 | Wang .............. | H04B 10/25751 |
| | | | 398/186 |
| 2015/0326321 A1 * | 11/2015 | Cho ..................... | H04B 10/272 |
| | | | 398/187 |
| 2016/0099775 A1 * | 4/2016 | Liu .................... | H04B 10/2575 |
| | | | 398/115 |
| 2019/0036611 A1 * | 1/2019 | Fujita .............. | H04B 10/50575 |
| 2019/0123823 A1 * | 4/2019 | Wang .............. | H04B 10/25751 |
| 2020/0162225 A1 * | 5/2020 | Chen Larsson ....... | H04L 5/0044 |

FOREIGN PATENT DOCUMENTS

| | | | | |
|---|---|---|---|---|
| JP | 2019121998 A | * | 7/2019 | ......... H04B 10/0795 |
| KR | 10-2015-0128434 | | 6/2020 | |
| WO | 2009-108831 A2 | | 9/2009 | |

* cited by examiner

OPTIMAL OPERATION METHOD OF HIGH-FREQUENCY PHASE DITHERING TECHNIQUE FOR COMPENSATING FOR INTERFERENCE NOISE IN ANALOG-OPTICAL TRANSMISSION-BASED MOBILE FRONTHAUL NETWORK, AND TRANSMITTER USING SAME

TECHNICAL FIELD

Example embodiments of the following description relate to an optimal operation method of a high-frequency phase dithering technique for compensating for interference noise in an analog optical transmission-based mobile fronthaul network and a transmitter using the same.

RELATED ART

After 4G mobile communication, a radio access network (RAN) is evolving into a cloud RAN (CRAN) structure. In the CRAN structure, a base band unit (BBU) configured to process a baseband signal is positioned in a central base station and a remote radio head (RRH) configured to convert a base signal to a wireless signal and to transmit and receive the wireless signal is positioned in a cell. A mobile fronthaul network that is a connection between the BBU and the RRH is implemented as a digital optical transmission link using a common public radio interface (CPRI) protocol. However, this digital optical transmission link-based mobile fronthaul network requires an excessively high transmission capacity compared to a wireless signal bandwidth since a wireless signal is digitally sampled and transmitted.

To outperform the above issue, proposed is a mobile fronthaul network using an analog optical transmission link. In the analog optical transmission link-based mobile fronthaul network, narrowband wireless signals of a plurality of channels are transmitted only after frequency conversion. Dissimilar from a CPRI-based digital optical transmission link, the mobile fronthaul network using the analog optical transmission link does not perform a format conversion and may have the following advantages accordingly. Initially, since a wireless signal is not digitally sampled, a high frequency efficiency may be achieved. Also, since an additional time delay by format conversion is absent, a time delay in the analog optical transmission link-based mobile fronthaul network has a less time delay in a link than that in the mobile fronthaul network using the digital optical transmission link. In addition, the analog optical transmission link-based mobile fronthaul network may be implemented as an intensity modulation-direct reception-based optical link using an optical transmitter and an economically excellent optical detector having a small bandwidth.

In an optical transmission system, multipath interference may occur due to Rayleigh backscattering and a defective optical connector. When the multipath interference occurs, interference noise by beating of a signal and an interference signal as well as the signal are detected since the signal and the interference signal are directly applied to a receiver. Due to interference noise, quality of a wireless signal transmitted through an analog optical transmission-based mobile fronthaul network may not meet signal quality requirements (e.g., an error vector magnitude (EVM) of 8% in an output end of a base station in the case of a 64quadrature amplitude modulation (QAM)-modulated wireless signal and an EVM of 3.5% in the case of a 256QAM-modulated wireless signal) required in a 5G mobile communication system.

To resolve this issue, proposed is a high-frequency phase dithering technique. The principle of this technique is to modulate a phase of an optical signal to a signal of a high frequency (frequency more than twice a bandwidth of the signal) and to emit interference noise out of a signal band. As a result, in the case of using the high-frequency phase dithering technique, power of interference noise occurring in the signal band decreases. Also, in the case of performing phase dithering using a signal having a desired bandwidth, it is possible to suppress interference noise regardless of a time difference between a signal and an interference signal. However, when using the high-frequency phase dithering technique, an optical signal spectrum is greatly broadened, which makes it difficult to chromatic dispersion and leads to significantly increasing a line width of an optical signal. Therefore, it is necessary to optimize a dithering signal according to requirements of a system to which the high-frequency phase dithering technique applies.

DETAILED DESCRIPTION

Subject

Example embodiments describes an optimal operation method of a high-frequency phase dithering technique for compensating for interference noise in an analog optical transmission-based mobile fronthaul network and a transmitter using the same, and more particularly, provides technology that may effectively suppress interference noise occurring when a plurality of defective optical connectors is present in the analog optical transmission-based mobile fronthaul network.

Example embodiments provide an optimal operation method of a high-frequency phase dithering technique for compensating for interference noise in an analog optical transmission-based mobile fronthaul network that may effectively suppress interference noise in an analog optical transmission-based mobile fronthaul network by optimizing a frequency position of an intensity-modulated signal and a modulation depth and a bandwidth of a high-frequency phase dithering signal and a transmitter using the same.

Example embodiments provide an optimal operation method of a high-frequency phase dithering technique for compensating for interference noise in an analog optical transmission-based mobile fronthaul network that may guarantee performance of an analog optical transmission scheme-based mobile fronthaul network even in a link in which a plurality of defective optical connectors is present by optimizing an optimal high-frequency phase dithering technique in a mobile fronthaul network using an analog optical transmission scheme and by effectively suppressing interference noise using a transmitter to which this technique is applied and a transmitter using the same.

Solution

An interference noise compensation method using a high-frequency phase dithering performed in an analog optical transmission-based mobile fronthaul network according to an example embodiment may include converting, by an optical transmitter, a frequency-multiplexed wireless signal to an intensity-modulated optical signal; and dithering, by the optical transmitter, a phase of the intensity-modulated optical signal to an orthogonal frequency division multiplexing (OFDM) signal.

The interference noise compensation method may further include receiving the optical signal transmitted from the optical transmitter through an optical transmission link that includes optical elements of an optical fiber and an optical connector; and converting, by an optical receiver, the received optical signal to an electrical signal.

The converting, by the optical receiver, the received optical signal to the electrical signal may include measuring intensity of an electric field of the received optical signal through a direct detector and, when connection of at least two optical connectors is poor in the optical transmission link, generating interference noise that includes a beating component of an electric field of a signal and an electric field of an interference signal in the received optical signal.

The dithering, by the optical transmitter, the phase of the intensity-modulated optical signal to the OFDM signal may include suppressing interference noise using a high-frequency phase dithering that uses a single frequency sinusoidal wave for the phase of the intensity-modulated optical signal.

The dithering, by the optical transmitter, the phase of the intensity-modulated optical signal to the OFDM signal may include suppressing interference noise using a high-frequency phase dithering that uses Gaussian noise having a desired bandwidth for the phase of the intensity-modulated optical signal.

A modulation index of the OFDM signal may be set to 2 to 4 and a bandwidth thereof may be set to 100 megahertz (MHz).

A carrier frequency of the frequency-multiplexed wireless signal may be set to 1.5 gigahertz (GHz) or more to suppress a performance degradation by interference noise.

An interference noise compensation apparatus using a high-frequency phase dithering performed in an analog optical transmission-based mobile fronthaul network according to another example embodiment may include an optical intensity modulator configured to convert a frequency-multiplexed wireless signal to an intensity-modulated optical signal in an optical transmitter; and an optical phase modulator configured to dither a phase of the intensity-modulated optical signal to an OFDM signal in the optical transmitter.

The interference noise compensation apparatus may further include an optical transmission link configured to receive the optical signal transmitted from the optical transmitter and to include optical elements of an optical fiber and an optical connector; and a direct detector configured to convert the received optical signal to an electrical signal in an optical receiver.

The direct detector may be configured to measure intensity of an electric field of the received optical signal and, when connection of at least two optical connectors is poor in the optical transmission link, to generate interference noise that includes a beating component of an electric field of a signal and an electric field of an interference signal in the received optical signal.

The optical phase modulator may be configured to suppress interference noise using a high-frequency phase dithering that uses a single frequency sinusoidal wave for the phase of the intensity-modulated optical signal.

The optical phase modulator may be configured to suppress interference noise using a high-frequency phase dithering that uses Gaussian noise having a desired bandwidth for the phase of the intensity-modulated optical signal.

A modulation index of the OFDM signal may be set to 2 to 4 and a bandwidth thereof may be set to 100 MHz.

A carrier frequency of the frequency-multiplexed wireless signal may be set to 1.5 GHz or more to suppress a performance degradation by interference noise.

An optical transmitter for compensating for interference noise using a high-frequency phase dithering performed in an analog optical transmission-based mobile fronthaul network according to still another example embodiment may include an optical intensity modulator configured to convert a frequency-multiplexed wireless signal to an intensity-modulated optical signal; and an optical phase modulator configured to dither a phase of the intensity-modulated optical signal to an OFDM signal. A modulation index of the OFDM signal may be set to 2 to 4 and a bandwidth thereof may be set to 100 MHz, and a carrier frequency of the frequency-multiplexed wireless signal may be set to 1.5 GHz or more to suppress a performance degradation by interference noise.

Effect

According to example embodiments, there may be provided an optimal operation method of a high-frequency phase dithering technique for compensating for interference noise in an analog optical transmission-based mobile fronthaul network that may effectively suppress interference noise in an analog optical transmission-based mobile fronthaul network by optimizing a frequency position of an intensity-modulated signal and a modulation depth and a bandwidth of a high-frequency phase dithering signal and a transmitter using the same.

According to example embodiments, there may be provided an optimal operation method of a high-frequency phase dithering technique for compensating for interference noise in an analog optical transmission-based mobile fronthaul network that may guarantee performance of an analog optical transmission scheme-based mobile fronthaul network even in a link in which a plurality of defective optical connectors is present by optimizing an optimal high-frequency phase dithering technique in a mobile fronthaul network using an analog optical transmission scheme and by effectively suppressing interference noise using a transmitter to which this technique is applied and a transmitter using the same.

BEST MODE

Hereinafter, example embodiments are described with reference to accompanying drawings. However, the described example embodiments may be modified in other various forms and the scope of the disclosure is not limited to the following example embodiments. Also, some example embodiments are provided to further completely explain the disclosure to those of ordinary skill in the art. Shapes and sizes of elements in drawings may be exaggerated for clearer description.

Performance of an analog optical transmission-based mobile fronthaul network may be limited by interference noise. As a method of suppressing such interference, a method of using a high-frequency phase dithering is proposed in the art. However, a specific method of using a high-frequency phase dithering technique needs to vary depending on a system to which the technique applies. Therefore, the example embodiment proposes a detailed method of using an existing high-frequency phase dithering technique for an analog optical transmission-based mobile fronthaul.

Figure 1:
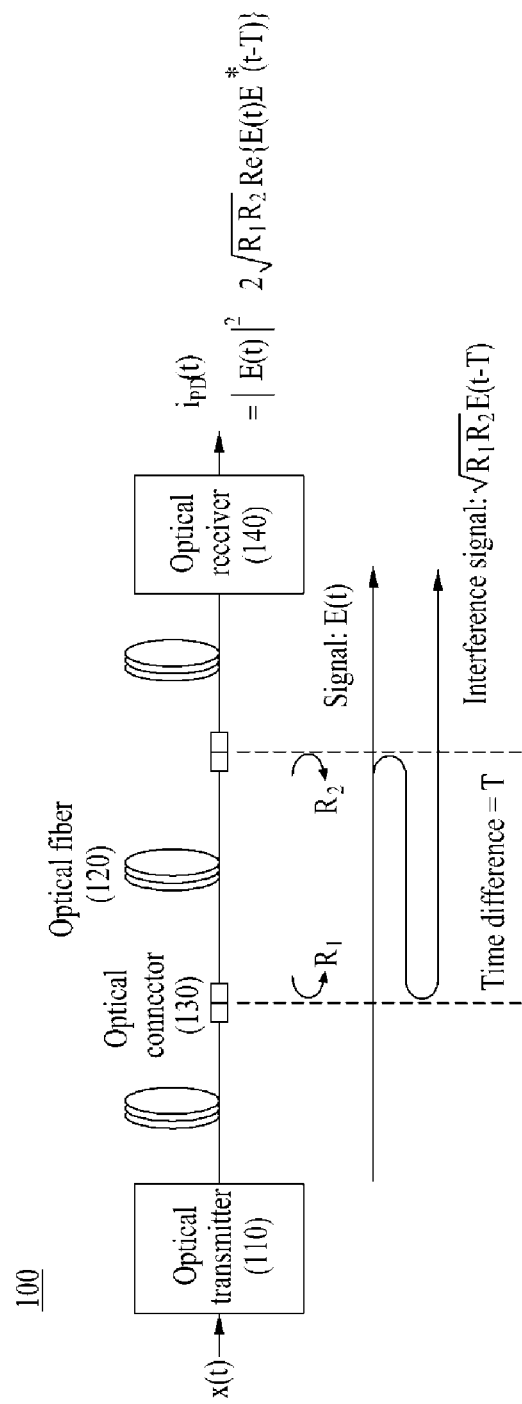
FIG. 1 illustrates a general analog optical transmission-based mobile fronthaul network.

FIG. 1 illustrates a general analog optical transmission-based mobile fronthaul network.

Referring to FIG. 1, a general analog optical transmission system 100 is illustrated. In general, an analog optical transmission system includes various optical elements, such as an optical transmission device (an optical transmitter 110), an optical fiber 120, an optical connector 130, an optical reception device (an optical receiver 140), and the like. The optical connector 130 is used to connect such optical elements.

The optical fibers 120 at ends of the respective optical elements are physically attached and connected by way of the optical connector 130. Due to a physical connection, connection between the optical fibers 120 may become unstable and reflection may occur in the optical connector 130. For example, when an air layer occurs between the optical fibers 120 due to incomplete physical attachment of the optical fibers 120, quantity of light reflected from the optical connector 130 may be −14 dB. Also, the reflection may occur due to Rayleigh scattering.

Figure 2:
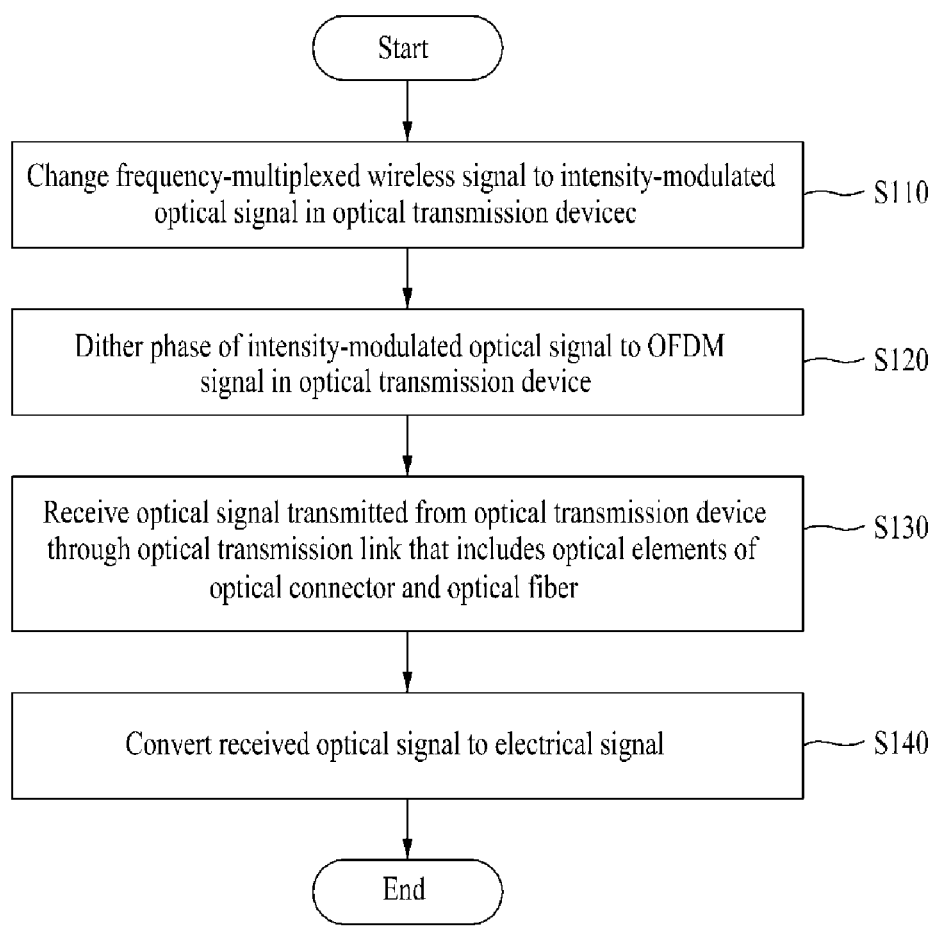
FIG. 2 is a flowchart illustrating an interference noise compensation method using a high-frequency phase dithering performed in an analog optical transmission-based mobile fronthaul network according to an example embodiment.

FIG. 2 is a flowchart illustrating an interference noise compensation method using a high-frequency phase dithering performed in an analog optical transmission-based mobile fronthaul network according to an example embodiment.

Referring to FIG. 2, the interference noise compensation method using the high-frequency phase dithering performed in the analog optical transmission-based mobile fronthaul network according to an example embodiment may include operation S110 of converting, by an optical transmission device, a frequency-multiplexed wireless signal to an intensity-modulated optical signal; and operation S120 of dithering, by the optical transmission device, a phase of the intensity-modulated optical signal to an orthogonal frequency-division multiplexing (OFDM) signal.

Also, the interference noise compensation method may further include operation S130 of receiving the optical signal transmitted from the optical transmission device through an optical transmission link that includes optical elements of an optical fiber and an optical connector; and operation S140 of converting, by an optical reception device, the received optical signal to an electrical signal.

Here, a modulation index of the OFDM signal may be set to 2 to 4 and a bandwidth thereof may be set to 100 megahertz (MHz), and a carrier frequency of the frequency-multiplexed wireless signal may be set to 1.5 gigahertz (GHz) or more to suppress a performance degradation by interference noise.

Hereinafter, each operation of the interference noise compensation method using the high-frequency phase dithering performed in the analog optical transmission-based mobile fronthaul network according to an example embodiment is further described.

The interference noise compensation method using the high-frequency phase dithering performed in the analog optical transmission-based mobile fronthaul network according to an example embodiment may be further described through an interference noise compensation apparatus using a high-frequency phase dithering performed in an analog optical transmission-based mobile fronthaul network according to an example embodiment.

Figure 3:
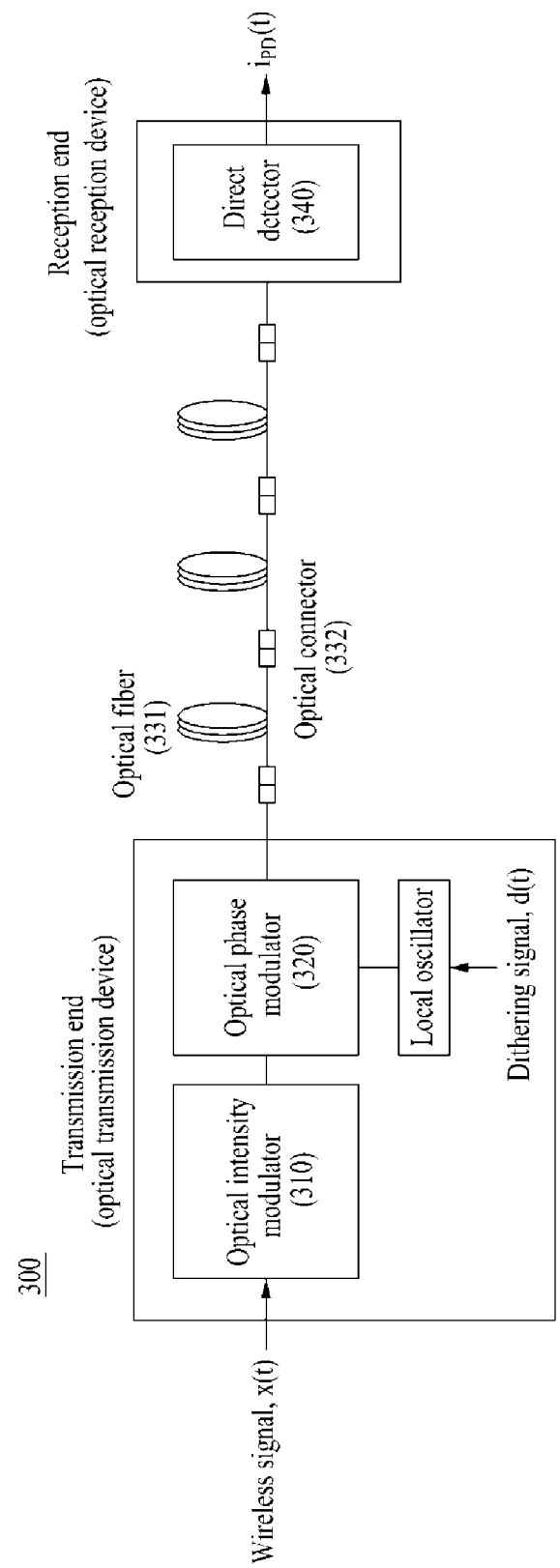
FIG. 3 illustrates an interference noise compensation apparatus using a high-frequency phase dithering performed in an analog optical transmission-based mobile fronthaul network according to an example embodiment.

FIG. 3 illustrates an interference noise compensation apparatus using a high-frequency phase dithering performed in an analog optical transmission-based mobile fronthaul network according to an example embodiment.

Referring to FIG. 3, an interference noise compensation apparatus 300 using a high-frequency phase dithering performed in an analog optical transmission-based mobile fronthaul network according to an example embodiment may include an optical transmission device that includes an optical intensity modulator 310 and an optical phase modulator 320. Also, the interference noise compensation apparatus 300 may further include an optical transmission link (331, 332) and a direct detector 340 of an optical reception device.

In operation S110, the optical intensity modulator 310 may convert a frequency-multiplexed wireless signal to an intensity-modulated optical signal in the optical transmission device.

In operation S120, the optical phase modulator 320 may dither a phase of the intensity-modulated optical signal to an OFDM signal in the optical transmission device. For example, the optical phase modulator 320 may suppress interference noise using a high-frequency phase dithering that uses a single frequency sinusoidal wave for the phase of the intensity-modulated optical signal. As another example, the optical phase modulator 320 may suppress interference noise using a high-frequency phase dithering that uses Gaussian noise having a desired bandwidth for the phase of the intensity-modulated optical signal.

In operation S130, the optical transmission link (331, 332) may include optical elements, such as an optical fiber 331 and an optical connector 332, configured to receive an optical signal transmitted from the optical transmission device.

In operation S140, the direct detector 340 may convert the received optical signal to an electrical signal in the optical reception device. Here, the direct detector 340 may measure intensity of an electric field of the received optical signal. When connection of at least two optical connectors 332 is poor in the optical transmission link (331, 332), interference noise that includes a beating component of an electric field of a signal and an electric field of an interference signal may occur in the received optical signal.

The optical phase modulator 320 may set a modulation index of the OFDM signal to 2 to 4 and may set a bandwidth thereof to 100 MHz. The optical intensity modulator 310 may set a carrier frequency of the frequency-multiplexed wireless signal to 1.5 GHz or more to suppress a performance degradation by interference noise.

Meanwhile, an optical transmission device for compensating for interference noise using a high-frequency phase dithering performed in an analog optical transmission-based mobile fronthaul network may include an optical intensity modulator configured to convert a frequency-multiplexed wireless signal to an intensity-modulated optical signal; and an optical phase modulator configured to dither a phase of the intensity-modulated optical signal to an OFDM signal. Here, a modulation index of the OFDM signal may be set to 2 to 4 and a bandwidth thereof may be set to 100 MHz, and a carrier frequency of the frequency-multiplexed wireless signal may be set to 1.5 GHz or more to suppress a performance degradation by interference noise. The optical transmission device for compensating for interference noise using the high-frequency phase dithering performed in the analog optical transmission-based mobile fronthaul network may include the aforementioned optical transmission device of the interference noise compensation apparatus using the high-frequency phase dithering performed in the analog optical transmission-based mobile fronthaul network according to an example embodiment. Therefore, further description is omitted.

Hereinafter, an example of the interference noise compensation method and device using the high-frequency phase dithering performed in the analog optical transmission-based mobile fronthaul network according to an example embodiment is further described.

In an optical transmission system, when connection between at least two optical connectors is unstable, performance of the optical transmission system may be limited due to interference noise by multipath interference. As illustrated in FIG. 3, when connection between two optical connectors is poor in the optical transmission system, an electric field $E(t)$ of a signal and an electric field $E(t-T)$ of a double-reflected interference signal are applied to a direct detector in an optical reception device. Here, T denotes a time difference between the signal and the interference signal. The direct detector measures intensity of the electric field of the received optical signal. Therefore, a photocurrent received at the direct detector includes square of intensity of the electric field of the signal, $|E(t)|^2$, and $Re\{E(t)E^*(t-T)\}$ that is a beating component of the electric field of the signal and an electric field of the interference signal. Here, the beating component of the electric field of the signal and the electric field of the interference signal is referred to as interference noise and the performance of a system that requires a high signal quality as in the analog optical transmission-based mobile fronthaul network may be limited by such interference noise.

A high-frequency phase dithering technique may be proposed to suppress the interference noise. An analog optical transmission-based mobile fronthaul network to which the high-frequency phase dithering technique is applied is illustrated in FIG. 3. To explain the principle of the high-frequency phase dithering technique, description is made based on a case in which a phase of an intensity-modulated optical signal is a sinusoidal wave. In the case of dithering the phase of the intensity-modulated optical signal using the sinusoidal wave, the electric field may be given as follows.

$$E(t)\sqrt{P_0}\sqrt{x(t)}\exp(j2\pi v_0 t + j\phi_n(t) + j\delta \sin(2\pi f_d t)) \quad \text{[Equation 1]}$$

Here, $P_0$ denotes the average optical power of an optical signal, $x(t)$ denotes intensity modulation, $v_0$ denotes an optical center frequency, $\phi_n(t)$ denotes phase noise of the optical signal, $\delta$ denotes a modulation index of a phase dithering signal, and $f_d$ denotes a frequency of the phase dithering signal.

When two defective optical connectors occur in an optical link, received photocurrent $i_{PD}$ that is output from a direct detector of a receiver may be represented as follows.

$$i_{PD(t)} = RP_0[x(t) - \sqrt{R_1 R_2}\sqrt{x(t)}\sqrt{x(t-T)}\cos(2\pi v_0 T - o_n(t) - o_n(t-T) - 2\delta \sin(\pi f_d T)\cos(2\pi f_d)(t-T/2)))] \quad \text{[Equation 2]}$$

Here, R denotes responsibility of the direct detector, each of $R_1$ and $R_2$ denotes a coefficient of reflection reflected by the optical connector, and T denotes a time difference between the signal and the interference signal.

Referring to Equation 2, the beating component of the signal and the interference signal as well as the signal ($x(t)$) are observed. Power spectral density (PSD) of received photocurrent may be derived by performing Fourier transformation on an auto-correlation of $i_{PD}$, which may be represented as follows.

$$S_{i_{PD}}(f) - S_x(f)^1 R_1 R_2 \left[ J_0^2(2\delta\sin(\pi f_d T)) \times S_N(f)^1 2\sum_{k=1}^{\infty} J_k^2(2\delta\sin(\pi f_d T)) \times S_N(f - kf_d) \right] \quad \text{[Equation 3]}$$

Here, $S_x(f)$ denotes PSD of $x(t)$, $S_N(f)$ denotes PSD of $\sqrt{x(t)}\sqrt{x(t-T)}\cos(2\pi v_0 T + o_n(t) - \phi_n(t-T))$ (i.e., interference noise), and $J_k(*)$ denotes a k-th Bessel function of first kind.

Through Equation 3, a method of suppressing interference noise using a high-frequency phase dithering using a single frequency sinusoidal wave may be derived. If magnitude of a dithering frequency fa is more than twice a bandwidth of $x(t)$, $S_N(f-kf_d)$ falls outside a signal band. Consequently, an amount of interference noise $S_N(f)$ that falls within the signal band corresponds to $J_0^2(2\delta \sin(\pi f_d T))$. Here, $J_0^2(2\delta \sin(\pi f_d T))$ may be a noise reduction factor.

In the case of using a high-frequency phase dithering technique using a sinusoidal wave, a degree of suppression of interference noise depends on a time difference (or a frequency of sinusoidal wave) between the signal and the interference signal. This issue may be resolved by dithering a phase of an optical signal with Gaussian noise having a desired bandwidth instead of the sinusoidal wave. For example, in the case of dithering the phase of the optical signal with Gaussian noise having a bandwidth greater than an inverse number of T that is the time difference between the signal and the interference signal, PSD of the received photocurrent may be given as follows.

$$S_i^{PD}(f) = P_0^2 |S_x(f) + h\exp(-\delta_d^2 R_n(\,))S_N(f)*\xi\{\exp(\delta_d^2 R_n(\tau))\cos(2\pi f_d \tau))\}] \quad \text{[Equation 4]}$$

Here, $R_n(t)$ denotes an auto-correlation of white noise used for dithering. Referring to Equation 4, PSD of received photocurrent does not depend on the time difference between the signal and the interference signal. However, in the case of increasing a modulation index of the dithering signal, it is predicted to suppress interference noise in a signal band, but quantitative estimation is difficult.

In the case of greatly increasing a modulation index and a bandwidth of the dithering signal, it is possible to sufficiently suppress interference noise, but the following issue may occur. First, since a spectrum of the optical signal greatly increases, an optical fiber may be vulnerable to chromatic dispersion. Second, since a line width of the optical signal is widened, it is difficult to set an RF carrier frequency of a wireless signal to be low. Therefore, it is necessary to specifically investigate an optimal dithering modulation index and bandwidth in consideration of requirements for performance of a commercial light source and modulators and performance of an analog optical transmission-based mobile fronthaul network.

In this simulation, 32 100-MHz OFDM signals are frequency-multiplexed and transmitted through intensity modulation of an optical signal. RF carrier frequency of OFDM signals is set to 2 GHz+(i−1)×122.88 MHz. Here, i refers to a channel number and denotes an integer between 1 and 32. Also, since a mobile communication system after 4G uses an OFDM signal having the same white noise and probability characteristic, a phase of the optical signal is dithered using the OFDM signal.

Figure 4:
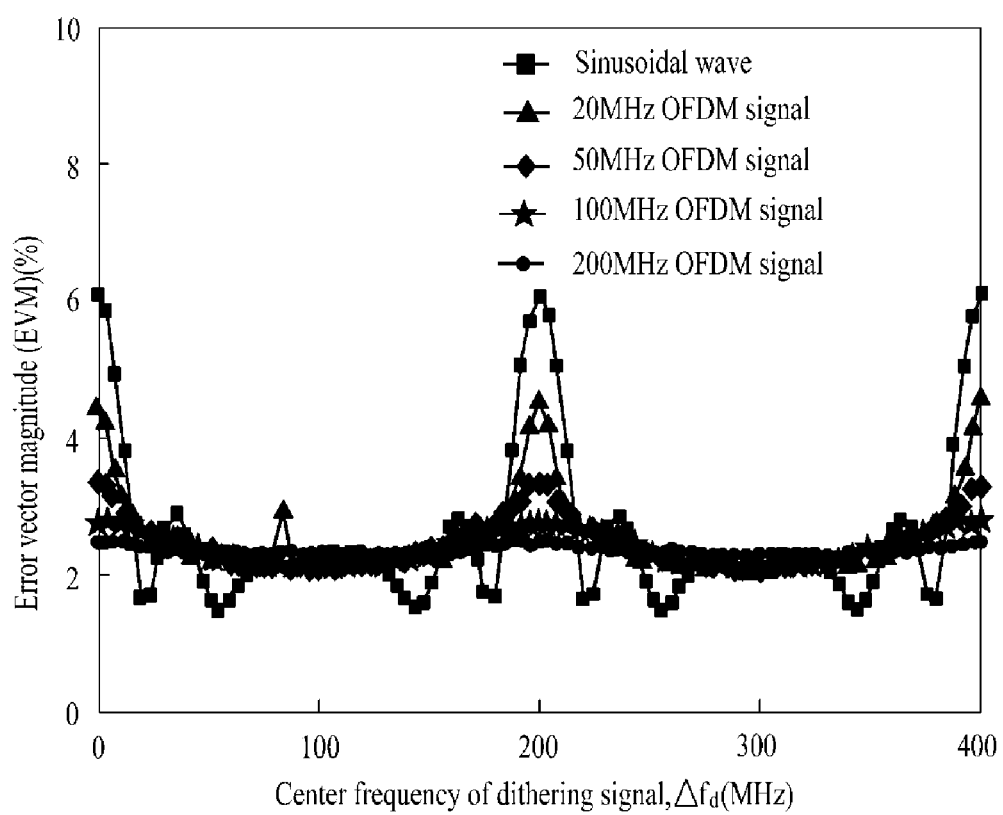
FIG. 4 illustrates error vector magnitude (EVM) performance of a 100-megahertz (MHz) orthogonal frequency division multiplexing (OFDM) signal transmitted through an analog optical transmission-based mobile fronthaul network for each dithering bandwidth according to an example embodiment.

FIG. 4 illustrates error vector magnitude (EVM) performance of a 100-MHz OFDM signal transmitted through an analog optical transmission-based mobile fronthaul network for each dithering bandwidth according to an example embodiment.

FIG. 4 shows EVM performance of an OFDM signal of channel 1 in various bandwidths of a dithering signal. Here, a time difference between a signal and an interference signal is set as 5 ns (which is the same as a path difference of 1 m). This is because, if the time difference between the signal and the interference signal is much less than a coherent time (generally, 1 μs) of a light source, degradation in performance caused by interference noise may be ignored. A result of FIG. 4 shows that, if a bandwidth of a dithering signal is set to 100 MHz or more, it is possible to suppress interference noise regardless of a frequency of the dithering signal (i.e., regardless of the time difference between the signal and the interference signal).

Figure 5:
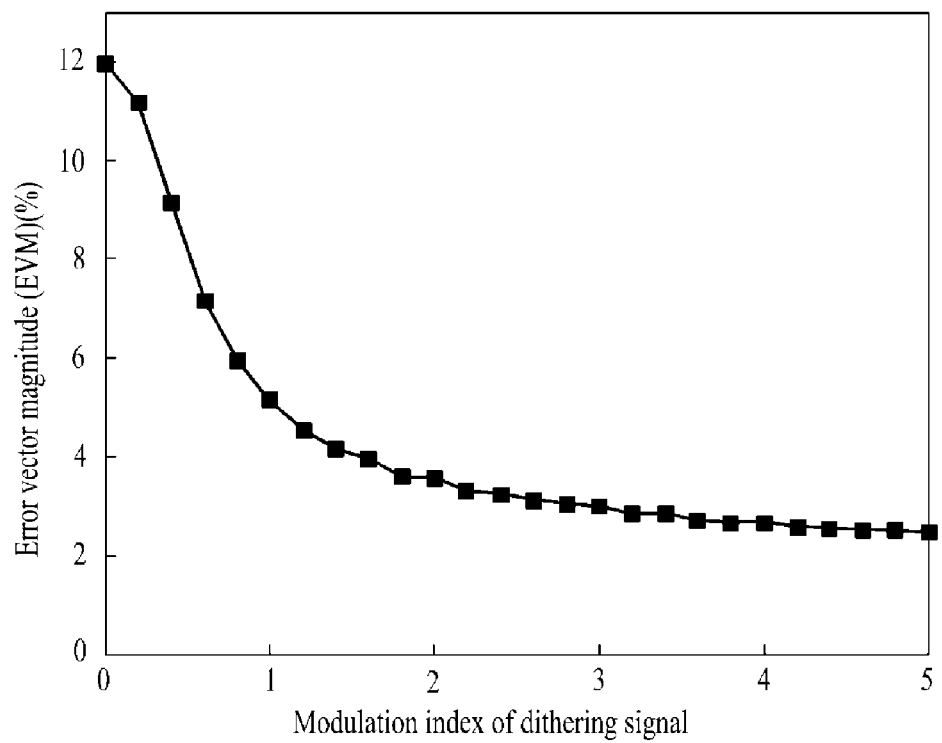
FIG. 5 illustrates EVM performance of a 100-MHz OFDM signal transmitted through an analog optical transmission-based mobile fronthaul network according to a dithering modulation index according to an example embodiment.

FIG. 5 illustrates EVM performance of a 100-MHz OFDM signal transmitted through an analog optical transmission-based mobile fronthaul network according to a dithering modulation index according to an example embodiment.

Figure 6:
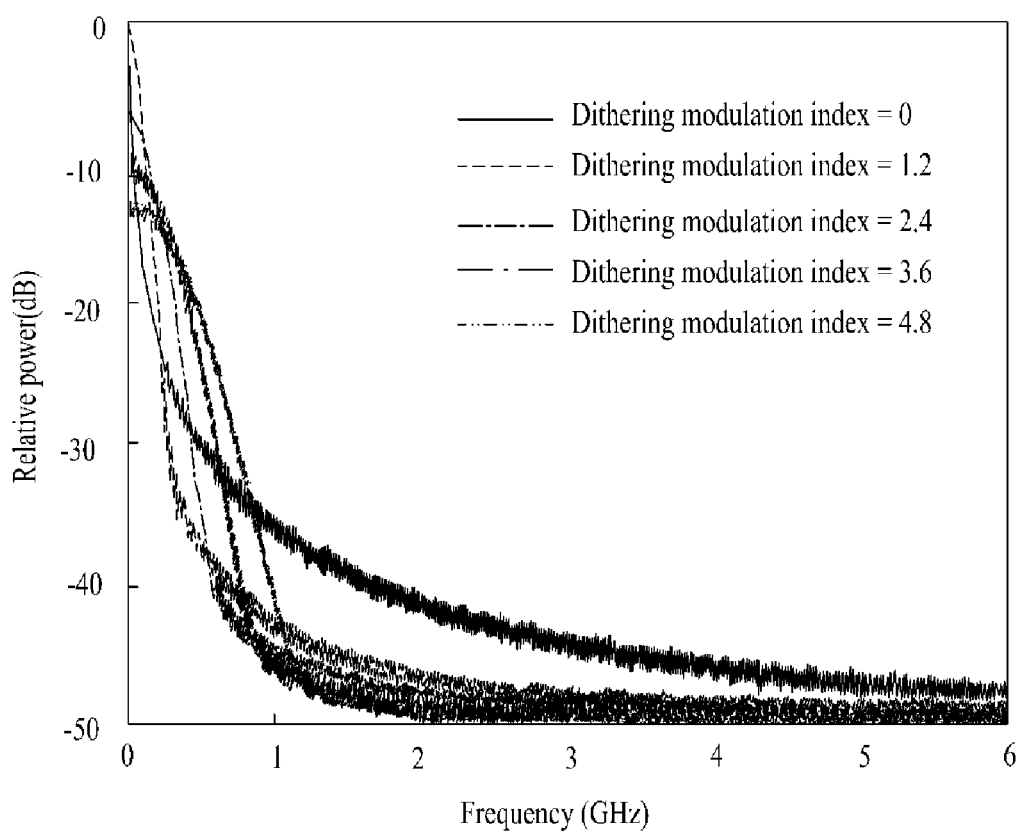
FIG. 6 illustrates a spectrum of received photocurrent in the case of dithering only a phase of an optical signal without an intensity-modulated signal according to an example embodiment.

FIG. 5 shows EVM of an OFDM signal of channel 1 according to a modulation index of a dithering signal when a bandwidth of the dithering signal is 100 MHz (Numerical simulation, EVM of channel 1, OMIrms of 32 100-MHz OFDM signals=0.16, Prec=0 dBm, SIR=20 dB, and 100-MHz OFDM dither centered at 12.5 GHz). As predicted, the EVM performance was improved according to an increase in a modulation depth. However, as a phase modulation depth increases greater than 2, the improvement effect is quickly saturated and a line width of an optical signal increases as shown in FIG. 6. Therefore, the modulation index of the dithering signal should not be increased by 4 or more.

FIG. 6 illustrates a spectrum of received photocurrent in the case of dithering only a phase of an optical signal without an intensity-modulated signal according to an example embodiment.

Referring to FIG. 6, it can be seen that, in the case of using a high-frequency phase dithering, strong noise occurs around direct current (DC) due to interference noise of an optical carrier. Therefore, in the case of setting a modulation index and a bandwidth of a dithering signal to 3.6 and 100 MHz, respectively, to acquire sufficient inference noise suppression effect, there is a need to verify an RF carrier frequency available in the analog optical transmission-based mobile fronthaul network. To this end, RF carrier frequency of 32 wireless signals was set to iX122.88 MHz and EVM of wireless signals transmitted through such channels was measured.

Figure 7:
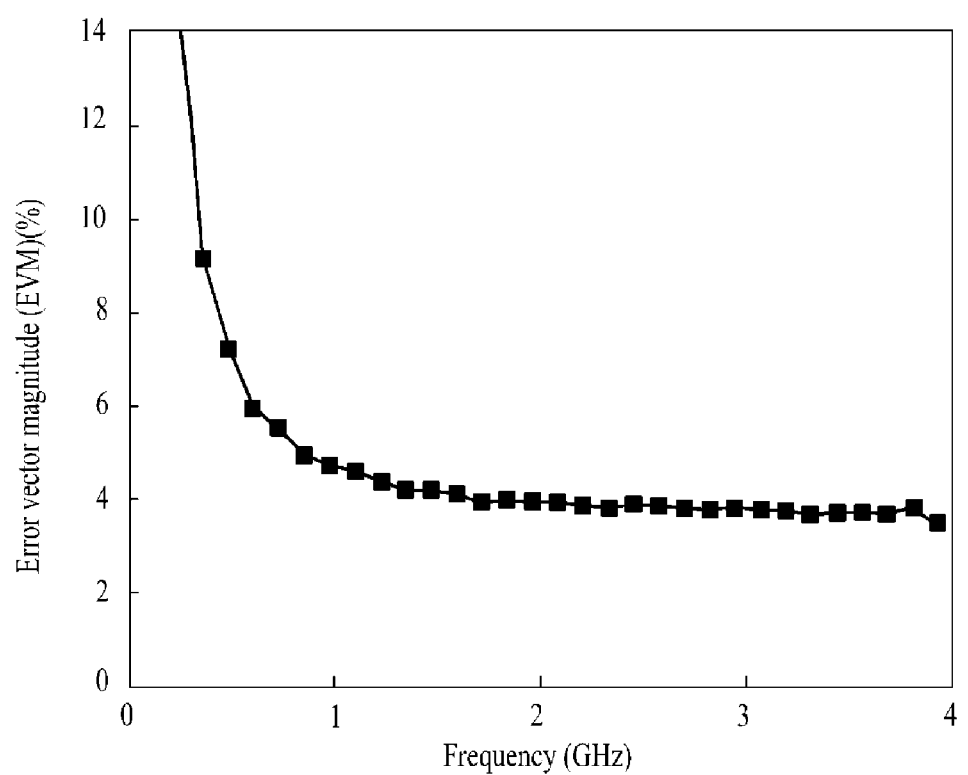
FIG. 7 illustrates EVM performance of 32 channel 100-MHz OFDM signal transmitted through a radio frequency (RF) carrier frequency ranging from 100 MHz to 4 gigahertz (GHz) in an analog optical transmission-based mobile fronthaul network according to an example embodiment.

FIG. 7 illustrates EVM performance of 32 channel 100-MHz OFDM signal transmitted through a radio frequency (RF) carrier frequency ranging from 100 MHz to 4 GHz in an analog optical transmission-based mobile fronthaul network according to an example embodiment.

Referring to FIG. 7, in the case of using a dithering signal of the above condition, if an RF carrier frequency of a wireless signal is 1.5 GHz or more, it is possible to prevent degradation in performance due to interference noise diffusion of optical carrier.

To effectively apply a high-frequency phase dithering technique, it may be good to set a modulation index and a bandwidth of a dithering signal to 3.6 and 100 MHz, respectively. In this case, in the case of setting an RF carrier frequency of a wireless signal to 1.5 GHz or more, it is possible to construct the analog optical transmission-based mobile fronthaul network while maximally suppressing the degradation in performance of interference noise. To verify this, after setting the dithering modulation index and bandwidth to 100 MHz and setting carrier frequency of 32 100 MHz wireless signals to 2 GHz+(i−1)×122.88 MHz, EVM of a signal transmitted through channel 1 was measured.

Figure 8:
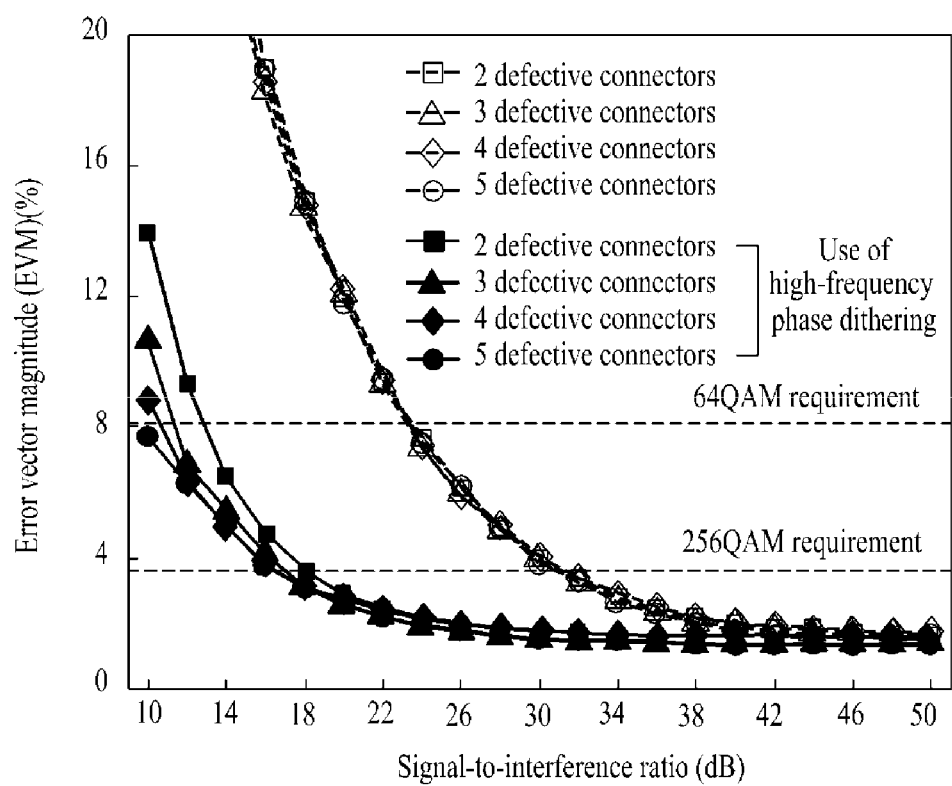
FIG. 8 illustrates EVM performance of a 100-MHz OFDM signal transmitted through an analog optical transmission-based mobile fronthaul network in which a plurality of defective connectors is present according to an example embodiment.

FIG. 8 illustrates EVM performance of a 100-MHz OFDM signal transmitted through an analog optical transmission-based mobile fronthaul network in which a plurality of defective connectors is present according to an example embodiment.

Referring to a result of FIG. 8, it can be verified that, in the case of using a high-frequency phase dithering technique, requirements for a signal-to-interference ratio was significantly relieved by using a dithering signal and an RF carrier frequency of a condition proposed in the example embodiment.

An optimal dither condition estimated through a simulation is to set a modulation index and a bandwidth of a dithering signal to 3.5 and 100 MHz, respectively, and to set an RF carrier frequency of a wireless signal transmitted through intensity modulation to 1.5 GHz. To verify performance of the optimized dithering technique, experiment was conducted. In this experiment, a single 100 MHz-OFDM was upconverted to 2 GHz and transmitted through intensity modulation.

Figure 9:
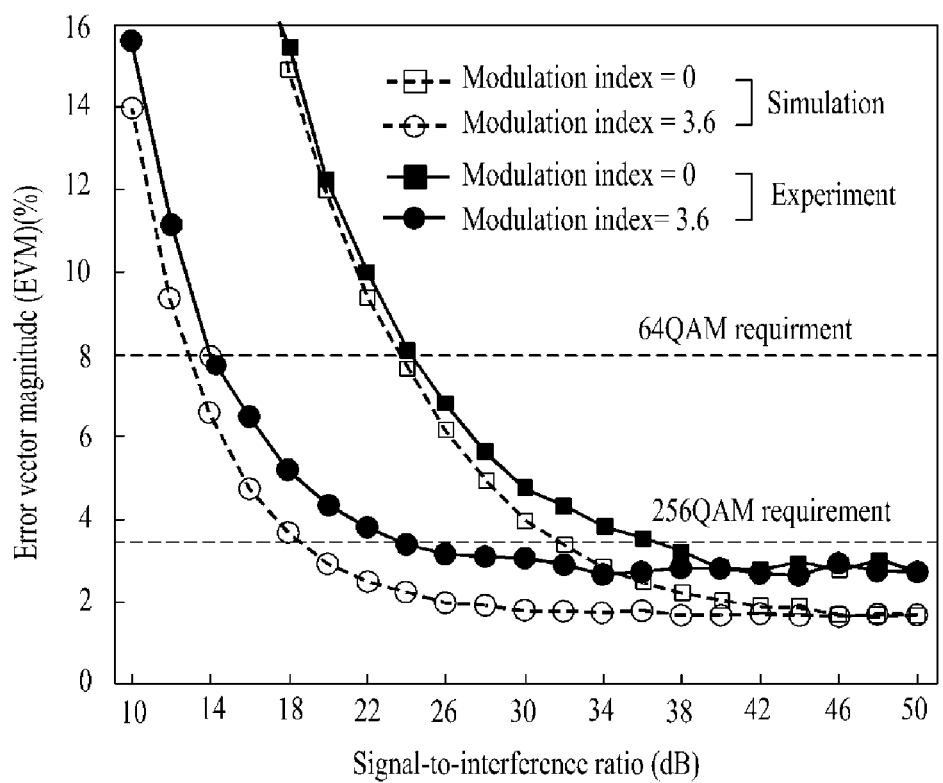
FIG. 9 illustrates a comparison between a simulation result and an experimental result for verifying performance of an optimized dithering technique according to an example embodiment.

FIG. 9 illustrates a comparison between a simulation result and an experimental result for verifying performance of an optimized dithering technical according to an example embodiment.

Referring to FIG. 9, when applying an optimal dithering condition as predicted in a simulation, a signal-to-interference ratio was lowered to 14 dB (in the case of a 64QAM modulated wireless signal).

Therefore, in the case of using a high-frequency phase dithering scheme based on the proposed scheme, it is possible to construct an analog optical transmission-based mobile fronthaul network robust against interference noise.

As described above, according to some example embodiments, it is possible to effectively suppress interference noise in an analog optical transmission-based mobile fronthaul network by optimizing a frequency position of an intensity-modulated signal and a modulation depth and a bandwidth of a high-frequency phase dithering signal.

Also, according to some example embodiments, it is possible to guarantee performance of an analog optical transmission scheme-based mobile fronthaul network even in a link in which a plurality of defective optical connectors is present by optimizing an optimal high-frequency phase dithering technique in a mobile fronthaul network using an analog optical transmission scheme and by effectively suppressing interference noise using a transmitter to which this technique is applied.

The apparatuses described herein may be implemented using hardware components, software components, and/or a combination thereof. For example, the apparatuses and the components described herein may be implemented using one or more general-purpose or special purpose computers, such as, for example, a processor, a controller, an arithmetic logic unit (ALU), a digital signal processor, a microcomputer, a field programmable array (FPA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device: may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be permanently or temporally embodied in any type of machine, component, physical equipment, virtual equipment, or a computer storage medium or device, to be interpreted by the processing device or to provide an instruction or data to the processing device. The software also may be distributed over network coupled computer systems so that the software is stored and executed in a distributed fashion. The software and data may be stored by one or more computer readable storage media.

The methods according to the above-described example embodiments may be configured in a form of program instructions performed through various computer devices and recorded in non-transitory computer-readable media. The media may also include, alone or in combination with the program instructions, data files, data structures, and the like. The program instructions recorded in the media may be specially designed and configured for the example embodiments or may be known to those skilled in the computer software art and thereby available. Examples of the media include magnetic media such as hard disks, floppy disks, and magnetic tapes; optical media such as CD-ROM and DVDs; magneto-optical media such as floptical disks; and hardware devices that are specially configured to store program instructions, such as read-only memory (ROM), random access memory (RAM), flash memory, and the like. Examples of program instructions include both machine code, such as produced by a compiler, and files containing higher level code that may be executed by the computer using an interpreter.

While the example embodiments are described with reference to specific example embodiments and drawings, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, or replaced or supplemented by other components or their equivalents.

Therefore, other implementations, other example embodiments, and equivalents of the claims are to be construed as being included in the claims.

What is claimed is:

1. An interference noise compensation method using a high-frequency phase dithering performed in an analog optical transmission-based mobile fronthaul network, the interference noise compensation method comprising:
    converting, by an optical transmitter, a frequency-multiplexed wireless signal to an intensity-modulated optical signal;
    dithering, by the optical transmitter, a phase of the intensity-modulated optical signal to an orthogonal frequency division multiplexing (OFDM) signal, wherein a modulation index of the OFDM signal is set to 2 to 4 and a bandwidth thereof is set to 100 megahertz (MHz) or more.

2. The interference noise compensation method of claim 1, further comprising:
    receiving the optical signal transmitted from the optical transmitter through an optical transmission link that includes optical elements of an optical fiber and an optical connector; and
    converting, by an optical receiver, the received optical signal to an electrical signal.

3. The interference noise compensation method of claim 2, wherein the converting, by the optical receiver, the received optical signal to the electrical signal comprises:
    measuring intensity of an electric field of the received optical signal through a direct detector and, when connection of at least two optical connectors is poor in the optical transmission link, generating interference noise that includes a beating component of an electric field of a signal and an electric field of an interference signal in the received optical signal.

4. The interference noise compensation method of claim 1, wherein the dithering, by the optical transmitter, the phase of the intensity-modulated optical signal to the OFDM signal comprises suppressing interference noise using a high-frequency phase dithering that uses a single frequency sinusoidal wave for the phase of the intensity-modulated optical signal.

5. The interference noise compensation method of claim 1, wherein the dithering, by the optical transmitter, the phase of the intensity-modulated optical signal to the OFDM signal comprises suppressing interference noise using a high-frequency phase dithering that uses Gaussian noise having a desired bandwidth for the phase of the intensity-modulated optical signal.

6. The interference noise compensation method of claim 1, wherein a carrier frequency of the frequency-multiplexed wireless signal is set to 1.5 gigahertz (GHz) or more to suppress a performance degradation by interference noise.

7. An interference noise compensation apparatus using a high-frequency phase dithering performed in an analog optical transmission-based mobile fronthaul network, the interference noise compensation apparatus comprising:
- an optical intensity modulator configured to convert a frequency-multiplexed wireless signal to an intensity-modulated optical signal in an optical transmitter;
- an optical phase modulator configured to dither a phase of the intensity-modulated optical signal with an orthogonal frequency division multiplexing (OFDM) signal in the optical transmitter, wherein a modulation index of the OFDM signal is set to 2 to 4 and a bandwidth thereof is set to 100 megahertz (MHz) or more.

8. The interference noise compensation apparatus of claim 7, further comprising:
- an optical transmission link configured to transmit the optical signal transmitted from the optical transmitter and to include optical elements of an optical fiber and an optical connector; and
- a direct detector configured to convert the received optical signal to an electrical signal in an optical receiver.

9. The interference noise compensation apparatus of claim 8, wherein the direct detector is configured to measure intensity of an electric field of the received optical signal and, when connection of at least two optical connectors is poor in the optical transmission link, to generate interference noise that includes a beating component of an electric field of a signal and an electric field of an interference signal in the received optical signal.

10. The interference noise compensation apparatus of claim 7, wherein the optical phase modulator is configured to suppress interference noise using a high-frequency phase dithering that uses a single frequency sinusoidal wave for the phase of the intensity-modulated optical signal.

11. The interference noise compensation apparatus of claim 7, wherein the optical phase modulator is configured to suppress interference noise using a high-frequency phase dithering that uses Gaussian noise having a desired bandwidth for the phase of the intensity-modulated optical signal.

12. The interference noise compensation apparatus of claim 7, wherein a carrier frequency of the frequency-multiplexed wireless signal is set to 1.5 gigahertz (GHz) or more to suppress a performance degradation by interference noise.

13. An optical transmitter for compensating for interference noise using a high-frequency phase dithering performed in an analog optical transmission-based mobile fronthaul network, the interference noise compensation device comprising:
- an optical intensity modulator configured to convert a frequency-multiplexed wireless signal to an intensity-modulated optical signal; and
- an optical phase modulator configured to dither a phase of the intensity-modulated optical signal to an orthogonal frequency division multiplexing (OFDM) signal,
- wherein a modulation index of the OFDM signal is set to 2 to 4 and a bandwidth thereof is set to 100 megahertz (MHz) or more, and
- a carrier frequency of the frequency-multiplexed wireless signal is set to 1.5 gigahertz (GHz) or more to suppress a performance degradation by interference noise.

* * * * *